United States Patent [19]

Takehara et al.

[11] Patent Number: 4,488,281
[45] Date of Patent: Dec. 11, 1984

[54] CAPACITANCE DETECTION TYPE RECORD STYLUS HAVING A CONDUCTIVE SHANK

[75] Inventors: Hideaki Takehara, Fujisawa; Yoshiyo Wada; Kunio Goto, both of Yokohama; Keiji Segawa, Sagamihara, all of Japan

[73] Assignee: Victor Company of Japan, Limited, Yokohama, Japan

[21] Appl. No.: 357,354

[22] Filed: Mar. 12, 1982

[30] Foreign Application Priority Data

Mar. 13, 1981 [JP] Japan .................................. 56-36953

[51] Int. Cl.³ .............................................. G11B 9/00
[52] U.S. Cl. ..................................... 369/126; 369/173
[58] Field of Search ................ 369/126, 173, 150, 151

[56] References Cited

U.S. PATENT DOCUMENTS

| 2,992,007 | 7/1961 | Bondley | 369/173 |
| 4,162,510 | 7/1979 | Keizer . | |
| 4,165,560 | 8/1979 | Matsumoto . | |
| 4,199,782 | 4/1980 | Wada et al. | 369/126 |
| 4,340,954 | 7/1982 | Chio et al. | 369/173 |

Primary Examiner—Donald E. McElheny, Jr.
Attorney, Agent, or Firm—Lowe, King, Price & Becker

[57] ABSTRACT

A capacitance detection type record stylus comprises a conductive shank and a diamond partially embedded in the shank so that the diamond projects downwardly from one end of the shank. The shank is formed with a bottom face for making slidable contact with the disk record. The shank and diamond are formed with a pair of common rear faces inclined with respect to the axis of the stylus to define an electrode forming face therebetween which extends from the bottom face of the diamond partially into the shank. The electrode forming face is inclined at an acute angle with respect to the axis so that the lower end of the electrode forming face is located at a point forward with respect to the upper end thereof and subtends at the lower end thereof at such an angle that the diamond can be lapped without causing defects to occur on the lapped surfaces. The electrode forming face is entirely covered by a conductive layer so that the latter establishes electrical connection with the shank to allow signals detected by the electrode to pass through the shank to an external circuit.

7 Claims, 9 Drawing Figures

FIG. 1a
FIG. 1b
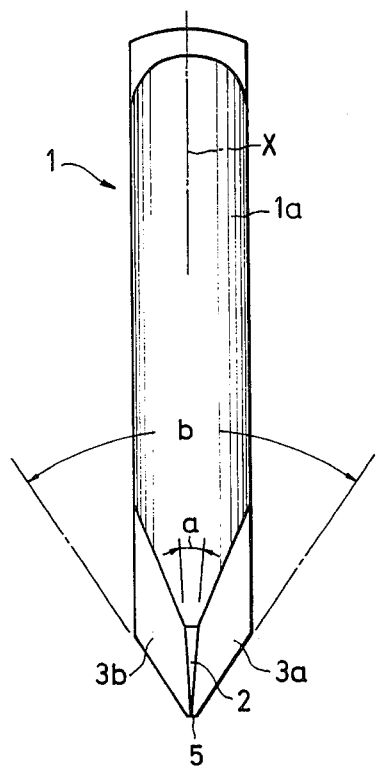
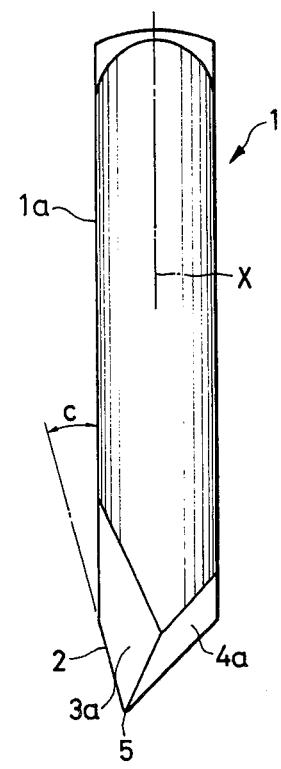

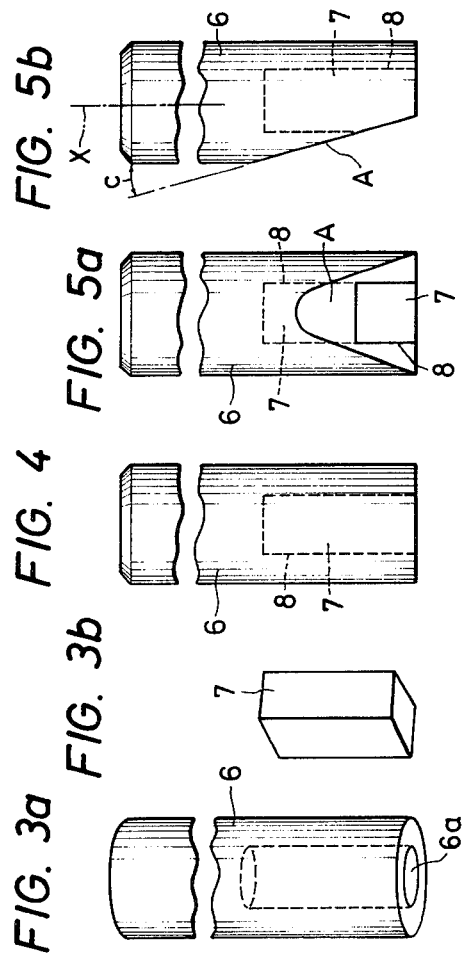

CAPACITANCE DETECTION TYPE RECORD STYLUS HAVING A CONDUCTIVE SHANK

BACKGROUND OF THE INVENTION

The present invention relates to a record stylus of the capacitance detection type.

Capacitance detection type record styli have been developed to detect, as capacitance variations, high density information stored on a disk record in the form of minute pits along spiral or concentric tracks. The conventional stylus comprises a hard, dielectric body such as diamond or sapphire and an electrode deposited on a rear surface of the dielectric body. The electrode extends to the bottom of the dielectric body which is made to slidably contact with the disk record which spins at considerably high speeds. Since the stylus electrode acts as a critical element for the detection of the recorded signal, its thickness should be commensurate with the length of the recorded bit and its width substantially corresponds to the width of the track.

To provide a passage for signals detected by the electrode the surface of the diamond is conventionally coated with a conductive layer and connected to the electrode. However, such coating requires that the surface of the diamond be polished to mirror finish to assure firm bonding between the two materials. This results in a long production time. Furthermore, since the narrow electrode makes a point contact with the conductive layer on the diamond, disconnection can occur in the conductive path or the electrical resistance thereof can increase if a shock is applied to the stylus.

SUMMARY OF THE INVENTION

According to the present invention, the record stylus comprises a conductive shank and a diamond partially and firmly embedded in the shank so that the diamond projects downwardly from one end of the shank. The diamond is formed with a bottom face for making slidable contact with the disk record, and the shank and diamond are formed with a pair of common rear faces inclined with respect to the axis of the stylus to define an electrode forming face therebetween. The electrode forming face extends from the bottom face of the diamond partially into the surface of the shank and is inclined at an acute angle with respect to the axis so that the lower end of the electrode forming face is located at a point forward with respect to the upper end thereof. This permits the electrode forming face to subtend at an appropriate angle at the lower end thereof without causing defects on the rear faces when the shank and diamond are shaped by a lapping method. The electrode forming face is entirely covered by a conductive layer so that it establishes electrical connection with the shank to allow the latter to act as a passage for signals detected by the electrode. Since the conductive shank forms a greater part of the stylus and the electrode extends partially into the surface of the shank, the stylus has a low electrical resistance and is less prone to damages.

BRIEF DESCRIPTION OF THE DRAWINGS

The invention will be described in further detail with reference to the accompanying drawings, in which:

FIGS. 1a and 1b are front and side elevational views of a prior art record stylus;

FIGS. 3a and 3b are perspective views of the conductive shank and diamond of the invention;

FIG. 4 is a front view of the shank with the diamond embedded therein before they are subject to lapping; and FIGS. 5a and 5b are front and side views of the shank with the diamond embedded therein.

DETAILED DESCRIPTION

Figure 2A:
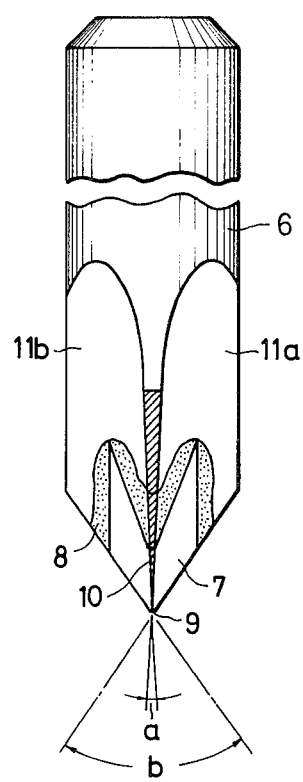
FIGS. 2a and 2b are front and side elevational views of a record stylus of the present invention.

Before describing the present invention reference is first made to FIGS. 1a and 1b in which a conventional capacitance detection stylus is illustrated. The prior art stylus is formed of a diamond 1 having a square cross-section and a flat rear surface 1a which faces in the direction of movement of a disk record, not shown. The downward end portion of the diamond is shaped by a lapping method to form a pair of inclined rear faces 3a, 3b to define an electrode forming face 2 therebetween, a pair of inclined front faces 4a, 4b (only face 4a is shown in FIG. 1b) and a disk contact face 5 at the bottom of the diamond. The electrode forming face 2 thus extends from the bottom of the diamond. The rear face 1a and electrode forming face 2 are coated with a thin layer of conductive material so that the conductive layer on the face 2 serves as the stylus electrode of which the lower end appears at the contact face 5 and the conductive layer on the rear face 1a serves to couple the electrode to an external circuit.

The electrode forming face 2 is created by lapping the diamond so that it subtends an angle of typically less than 10 degrees (as indicated by "a" in FIG. 1a). From the standpoint of stylus lifetime, it is desired that the width of the stylus electrode be small as possible to keep it substantially constant over a long period of time even though the diamond diminishes in length by contact wear with the disk record. However, from the operational standpoint, the small angle value "a" would result in an exessively long electrode having a high resistance value and therefore a low level output. The problem is further compounded by the fact that there is a certain range of angles in which the diamond crystal structure tends to easily break apart when the lapped surface falls in that particular range. To overcome this problem the current practice involves lapping the electrode forming face 2 at an angle "c" with respect to the axis "x" of the stylus so that its lowermost end terminates at a point forward of the extension of the rear face 1a.

To permit the conductive layer to be firmly bonded to the diamond surface it is necessary that rear face 1a and electrode forming face 2 be polished to a mirror finish. If the mirror finished surfaces are not perfect, a discontinuity is likely to occur between the electrode and the conductive layer on the rear face 1a.

Since this mirror polishing process involves a substantial amount of time, the overall production time of the stylus increases undesirably with an attendant cost increase. Furthermore, since the prior art method employs square cross-section diamonds the stylus is very expensive. Another disadvantage resides in the fact that since the electrode is formed of a conductive layer over the full length of the stylus, damages thereon tend to occur thereon which increase the resistance of the electrode resulting in a low level output.

The present invention has for its object the elimination of the above described prior art disadvantages.

Figure 2B:
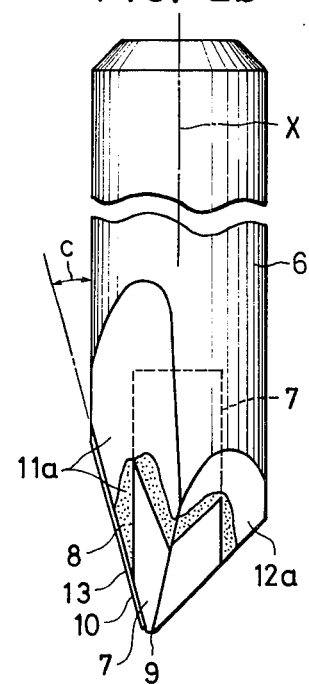

FIGS. 2a and 2b are illustrations of an embodiment of the record stylus constructed according to the present invention. In FIG. 2a, numeral 6 indicates a shank formed of a conductive material, numeral 7 indicating a diamond partially embedded firmly in the lower end portion of the conductive shank 6.

The diamond 7 is integrated with the shank 6 by forming a central hole 6a on the bottom thereof, engaging the diamond 7 into the hole with a silver solder (or silver-copper solder) therebetween and heating the shank to fuse the silver solder to form a composite body. The composite body is then lapped into a shape as shown in FIGS. 2a and 2b. Illustrated at 8 in FIGS. 2a and 2b is the silver solder firmly bonding the shank and the diamond.

Suitable material for the shank 6 is a metal having a good afinity to diamond such as titanium or hafnium. The diamond body 7 may be selected from natural diamond stones or from artificial ones.

While the shank 6 may either be of circular or square cross-section, the embodiment which will now be described hereinbelow employs a titanium cylindrical shank, typically 2-mm long and 0.3-mm in diameter. The diamond 7 is of a square cross-section, for example, having 0.15 mm on each side with a length of 0.45 mm, and is shown in FIG. 2b by broken lines.

The diamond 7 is shaped to form a disk contact face 9 at the bottom thereof and an electrode forming face 10 which is inclined at an angle "c" typically 20 degrees or less (preferably, 15 degrees) with respect to the longitudinal axis "x" of the shank 6. On the electrode forming face 10 is deposited a conductive layer which is electrically connected to the conductive shank 6 so that the latter serves as a conductor to an external circuit.

The composite body of shank and diamond has one end thereof lapped to form a rear face A inclined at an angle "c" with respect to the axis "x" as shown in FIG. 5b. It is seen that by doing so part of the diamond 7 is cut off to reveal a square-shaped face within a frustoconical cross-section of the shank 6 as shown in FIG. 5a.

The shank 6 is further lapped to form a pair of inclined rear faces 11a and 11b so that they make an angle "b" typically 70 degrees defining the electrode forming face 10 between them on the rear face A so that it subtends an angle "a" typically 6 degrees. This avoids the range of angles in which the diamond's crystal structure is easily cracked during the lapping process. The electrode forming face 10 lies on a flat plane extending from the diamond's tip passing over the silver solder layer 8 into the surface of the shank 6 as indicated by hatching in FIG. 2a. The lapping process is followed by formation of a pair of inclined front faces 12a and 12b (only face 12a being shown) which cut across diamond 7 and shank 6.

Next, titanium is deposited by sputtering technique on the electrode forming face 10 to form a conductive layer 13 thereon to act as the electrode. The electrode 13 extends from the bottom of the stylus to the shank 6 and partially overlies the shank 6. The faces 11a, 11b, 12a and 12b are then lapped slightly to remove undesirable conductive material which may be deposited thereon. The lower end of the diamond is then lapped to form the disk contact face 9 with which the lower end of the electrode 13 is in the same plane.

Alternatively, the formation of the conductive layer 13 on the electrode forming face 10 may precede the formation of the rear and front faces 11a, 11b, 12a and 12b.

Since the electrode 13 is deposited in overlying relationship with the shank 6 through the intermediate layer of a metallic soldering material, the signal detected by the electrode 13 will find a low resistance path through the shank 6 which occupies a substantial part of the stylus and disconnection is less likely to occur between the electrode 13 and shank 6.

It is seen that the invention only requires a small amount of diamond which may be either natural or artificial and that the lapping process can be achieved with ease with an attendant reduction in production time.

The record stylus according to the invention thus effectively overcomes the prior art problems at relatively low costs.

What is claimed is:

1. A record stylus for detecting, as capacitance variations, signals recorded on a disk record in the form of minute pits along tracks, comprising:
   a conductive shank, the shank having a surface,
   a diamond partially embedded in said shank so that the diamond projects downwardly from one end of the shank, said diamond being formed with a bottom face for making slidable contact with said disk record,
   said shank and diamond being formed with a pair of rear faces inclined with respect to an axis of said stylus to define an electrode forming face therebetween,
   said electrode forming face extending from said bottom face partially into the surface of said shank,
   a conductive layer forming an electrode coated over the entire area of said electrode forming face to establish electrical connection with said shank to allow the latter to act as a passage for signals detected by the electrode.

2. A record stylus as claimed in claim 1, wherein said shank is formed of titanium or hafnium.

3. A record stylus as claimed in claim 1, wherein said conductive shank is formed with a pocket in which said diamond is embedded.

4. A record stylus as claimed in claim 1, wherein said electrode forming face is inclined at an acute angle with respect to said axis so that a lower end of the electrode forming face is located at a point forward of an upper end thereof.

5. A record stylus as claimed in claim 1, wherein said shank is formed of titanium or hafnium and said electrode forming face is inclined at an acute angle with respect to said axis so that the lower end of the electrode forming face is located at a point forward with respect to the upper end thereof.

6. A record stylus for detecting, as capacitance variations, signals recorded on a disk record in the form of minute pits along tracks, comprising:
   a conductive shank, the shank having a surface,
   a diamond partially embedded in said shank so that the diamond projects downwardly from one end of the shank, said diamond being formed with a bottom face for making slidable contact with said disk record,
   said shank and diamond being formed with a pair of rear faces inclined with respect to an axis of said stylus to define an electrode forming face therebetween, said electrode forming face extending from said bottom face partially into the surface of said shank, a conductive layer forming an electrode coated over the entire area of said electrode forming face to establish electrical connection with said shank to allow the latter to act as a passage for signals detected by the electrode, said conductive layer including a metallic soldering material for cementing said diamond to said shank, the soldering material making electrical contact with said electrode.

7. A record stylus for detecting, as capacitance variations, signals recorded on a disk record in the form of minute pits along tracks, comprising:

signal transmission means for capacitive signals detected by the stylus including a conductive shank, the shank having a surface, a diamond partially embedded in said shank so that the diamond projects downwardly from one end of the shank, said diamond being formed with a bottom face for making slidable contact with said disk record, said shank and diamond being formed with a pair of rear faces inclined with respect to an axis of said stylus to define an electrode forming face therebetween, said electrode forming face extending from said bottom face partially into the surface of said shank, a conductive layer forming an electrode coated over the entire area of said electrode forming face to establish electrical connection with said shank to allow the latter to act as a passage for signals detected by the electrode.

* * * * *